United States Patent [19]

Scantlin et al.

[11] 4,210,703
[45] Jul. 1, 1980

[54] POLYESTER-FILM BACKED MAGNETIC RECORDING TAPE HAVING EPOXY SUBBING LAYER

[75] Inventors: William M. Scantlin, Woodbury; Lawrence M. Clemens, Minneapolis, both of Minn.

[73] Assignee: Minnesota Mining and Manufacturing Company, St. Paul, Minn.

[21] Appl. No.: 2,790

[22] Filed: Jan. 11, 1979

[51] Int. Cl.$^2$ ............................................. B32B 27/38
[52] U.S. Cl. .................................. 428/413; 427/54.1; 427/130; 427/131; 427/132; 428/480; 428/900
[58] Field of Search ...................... 428/413, 480, 900; 427/54, 130, 131, 132

[56] References Cited

U.S. PATENT DOCUMENTS

| | | | |
|---|---|---|---|
| 3,661,874 | 5/1972 | Olson | 260/833 |
| 4,049,566 | 9/1977 | Brilovich | 428/900 |
| 4,135,036 | 1/1979 | Mukaida | 428/900 |

*Primary Examiner*—Marion McCamish

[57] ABSTRACT

Cationically polymerized epoxy resin subbing layer for the magnetizable and the backside coating, if any, of polyester-film-backed magnetic recording tape acts as a barrier against extraction and migration of low-molecular-weight components of the polyester film backing which otherwise would tend to crystallize on the surface of the magnetizable coating.

14 Claims, No Drawings

POLYESTER-FILM BACKED MAGNETIC RECORDING TAPE HAVING EPOXY SUBBING LAYER

BACKGROUND OF THE INVENTION

The backing for most magnetic recording tapes is biaxially oriented polyester film, especially polyethylene terephthalate which has such qualities as a smooth surface, high tensile strength and toughness, good dimensional stability, good resistance to moderately elevated temperatures and unchanging properties with the passage of time. When used as a magnetic recording tape backing, polyester film does have a troublesome drawback. Low-molecular-weight organic components of the film, generally referred to as cyclic oligomers, principally trimers, extracted by the solvent used in coating the magnetizable coating, tend to migrate to and crystallize at the surface of the magnetizable coating. Even when the magnetizable coating is applied without solvent, there is a problem of migration of the low-molecular-weight components through the magnetizable coating over a period of time. Such components gradually transfer to and build up on the recording/playback heads to cause an undesirable loss of signal.

In a magnetic recording tape having a backside coating, such as a controlled-wind coating primarily comprising conductive carbon black and binder, the low-molecular-weight components also tend to be solvent-extracted into and to migrate to the surface of that coating. During storage of the tape in roll form, they tend to crystallize on the surface of the magnetizable coating as well as on the backside coating.

It is common to treat the polyester film backing to improve the adhesion of magnetizable coatings. For example, the polyester film backing may be treated with para-chlorophenol which attacks its surface, thus enhancing the adhesion of the magnetizable coatings. See U.S. Pat. No. 3,607,354. However, this adhesion-promoting treatment seems to aggravate the trimer exudation problem. U.S. Pat. No. 3,215,554 discloses vinylidene chloride/acrylonitrile copolymers as priming or subbing layers for a polyester film backing of magnetic recording tape. The subbing layer for the polyester film backing of the magnetic recording tape of U.S. Pat. No. 3,387,995 is a polycondensate of terephthalic acid, isophthalic acid and ethylene glycol. That of U.S. Pat. No. 3,661,874 is an aminized reaction product of an epoxidized polybutadiene. Of such subbing layers, it is believed that only that of U.S. Pat. No. 3,661,874, if thoroughly cured, provides a significant barrier to the migration of low-molecular-weight components from the polyester film. However, the temperature required for a good cure tends to distort the polyester film backing unless it is restrained during the cure.

An entirely different problem in the manufacturing of magnetic recording tape arises out of a desire that the surface of the magnetizable coating be as smooth as possible. Ordinarily, the surfaces of a polyester film are roughened by a slip agent for windup purposes, and that roughness is carried through in part to the surface of the magnetizable layer. A smoother magnetizable coating tends to exhibit reduced noise.

OTHER PRIOR ART

Epoxy resins can be cured very quickly by photoinitiated cationic polymerization. See J. Radiat. Curing, 5(1), January 1978, pages 2–17, which says that triaryl-sulfonium salts are latent photochemical sources of acids such as $HBF_4$, $HPF_6$, $HAsF_6$ and $HSbF_6$ which are well known initiators of cationic polymerization. The article reports that diaryliodonium salts produce the same result. Other onium salts which are latent photochemical sources of initiators of cationic polymerization of epoxy resin are disclosed in U.S. Pat. No. 4,101,513.

THE PRESENT INVENTION

The problem of extraction and migration of low-molecular-weight components and their crystallization on the surfaces of polyester-backed magnetic recording tape can be virtually eliminated by a subbing or primer layer which acts as a barrier to low-molecular weight components of the polyester film backing. The barrier is a cationically polymerized epoxy resin which can be applied at a temperature involving no danger of distorting the film.

Preferably the epoxy resin and a photoinitiator of cationic polymerization are together coated onto the polyester film from a solvent which quickly volatilizes, whereupon the coating can be exposed to ultraviolet light which decomposes the photoinitiator to generate a fast-acting cationic curing agent for the epoxy resin. Usually the epoxy resin becomes cured to a tack-free state simply by brief exposure to the ultraviolet light, but if not, it should be cured further by heat prior to application of the magnetizable coating of the recording tape. In addition to its barrier function, the subbing layer tends to promote adhesion and it also enhances the smoothness of the magnetizable coating, especially when the film has a roughness such as is often imparted by a slip agent. Subbing layers formed from epoxy resins which are viscous liquids at room temperature are especially effective in the latter respect.

The novel barrier is also useful as a subbing layer for the backside coating, if any, of magnetic recording tape. In such case, it inhibits low-molecular-weight components from reaching the surface of the magnetizable coating through the backside coating.

In manufacturing the magnetic recording tape, the novel subbing layer is conveniently applied in-line with the subsequent magnetizable or backside coating, since the subbing layer can be cured to a tack-free state within a few seconds. The subbing layer is immediately capable of virtually prohibiting the extraction of low-molecular-weight components from the film backing by the solvents used in applying the magnetizable or backside coating.

Extensive experimentation indicates the utility of any epoxy resin that can be cationically polymerized to a strong, tough thermoset state. Particularly preferred are epoxy resins which can be cationically polymerized at fast rates such as the cycloaliphatic epoxy resins. Also useful in this respect are the condensation products of bisphenol A and epichlorohydrin and the epoxidized novolak resins.

To create the most effective barrier against the migration of low-molecular-weight components, the epoxy resin should have at least about two 1,2-epoxy groups per molecule and an epoxide equivalent weight of less than 300 in order to provide a rather tightly crosslinked network. In amounts up to about 10% by weight of the total polymerizable composition, a polyol such as triethylene glycol tends to enhance the rate of polymerizing the epoxy resin. However, at more than 30% by weight of the polymerizable composition, a polyol tends to reduce the effectiveness of the cured layer as a barrier against migration of the low-molecular-weight components. At least up to 50% by weight of the polymerizable composition may comprise a monofunctional epoxide such as an alkyl glycidyl ether having an epoxide equivalent weight of less than 300.

The cationically polymerized epoxy resin layer should provide an effective barrier against the solvent extraction and migration of low-molecular-weight components of the polyester film backing at virtually monomolecular thickness. However, to ensure against discontinuities, a cured thickness of at least 0.1 micrometer is preferred. Thicknesses exceeding about five micrometers may be economically wasteful.

Preferred as photoinitiators are the triarylsulfonium salts similar to those disclosed in the above-cited J. Radiat. Curing of Jan. 1978, especially the triarylsulfonium salts of $HBF_4$, $HPF_6$, $HAsF_6$ and $HSbF_6$. Also particularly useful are diaryliodonium salts such as are referenced in that publication and diazonium salts disclosed in U.S. Pat. No. 3,708,296. Even though they provide very fast cationic polymerization of the epoxy resin, blends of those photoinitiators with epoxy resin can be stored in darkness at ordinary room temperature for more than a year without significant reaction.

In the absence of a photoinitiator, cationic polymerization of epoxy resin can be carried out at temperatures of 70°–105° C., with the epoxy resin becoming tack-free at that temperature within two minutes. A mixture of dibutyl diphenyl tin, 2,6-dimethylaniline and hydrogen hexafluoro antimonate(V) hexahydrate is suitable for this purpose. However, it may be necessary to prepare a fresh coating composition at least once for each 8-hour shift.

Of the following tests the first three were employed to evaluate effectiveness of barriers against the migration of low-molecular-weight components of biaxially-oriented polyethylene terephthalate film under conditions simulating accelerated aging.

SURFACE BARRIER TEST

A piece of polyester film having a surface barrier is placed in an oven at 140° C. for 24 hours, and the surface of the barrier is then examined at 200× magnification under polarized light. The volume of low-molecular-weight components which crystallize in a square centimeter of the surface of the barrier is calculated by estimating the diameter of each observable crystal and assuming it has a half-sphere shape. This test provides a preliminary indication of the effectiveness of a barrier as a subbing layer in a magnetic recording tape.

SUBBING LAYER BARRIER TEST

Moderate pressure is applied to a piece of polyester-backed magnetic recording tape having a subbing layer beneath the magnetizable coating with the magnetizable coating in contact with a glass slide etched to provide seeding points. After 140° C. for 24 hours, the surface of the magnetizable coating is examined, and the volume of observable crystals is calculated in the same way as in the Surface Barrier Test.

MAGNETIC RECORDING TAPE TEST

Two pieces of a magnetic recording tape are held at 140° C. for 24 hours while the magnetizable coating of one piece is under moderate pressure against the backside coating of the other. The surface of the magnetizable coating is then examined as in the Surface Barrier Test.

SURFACE EXTRACTABLES TEST

For five minutes at room temperature, 25 ml of chloroform is in contact with 25 $cm^2$ of one face of a polyester film which may have a surface barrier to be tested. The chloroform is then analyzed using standard liquid chromatographic techniques to measure the amount of extracted material having a molecular weight of 576 when the polyester film is polyethylene terephthate film. Since the predominant low-molecular-weight component of polyethylene terephthalate film is trimer having a molecular weight of 576, the test accurately indicates the degree of extraction of low-molecular-weight components. This test may be used to provide a preliminary evaluation of the effectiveness of a barrier against solvent extraction of low-molecular-weight components of a polyester film upon subsequent application of the magnetizable or backing coating.

PRELIMINARY TESTING

A variety of surface barriers were applied to biaxially-oriented polyethylene terephthalate film 25 micrometers in thickness. In each case, a 10% solution of an epoxy resin composition was applied with a knife coater. Some of the compositions contained diluent. Each composition employed 2 parts by weight of triarylsulfonium hexafluoroantimonate per 100 parts of the epoxy resin. The dried coatings were exposed to two medium-pressure mercury ultraviolet lamps at a distance of about 6 cm for an exposure of 5.3 watts/$m^2$/min. to provide cured surface barriers about ¾ micrometer in thickness. These were compared by the Surface Barrier Test to an identical polyester film having no coating, with the following results:

| Epoxy Resin | Diluent Name | parts | Volume of Crystals ($cm^3/cm^2$) |
|---|---|---|---|
| None | None | — | $10^{-6}$ |
| ERL 4221 | None | — | $<10^{-14}$ |
| " | Polytetramethylene glycol (MW 650) | 10 | $10^{-13}$ |
| " | " | 20 | $10^{-9}$ |
| " | Triethylene glycol | 10 | $<10^{-14}$ |
| " | " | 20 | $<10^{-14}$ |
| " | " | 30 | $10^{-7}$ |
| " | Butyl glycidyl ether | 20 | $<10^{-14}$ |
| " | " | 50 | $<10^{-14}$ |
| ERL 4234 | None | | $<10^{-14}$ |
| ERL 4206 | " | | $<10^{-14}$ |
| ERL 4289 | " | | $10^{-9}$ |
| D.E.N.431 | " | | $10^{-10}$ |
| D.E.N.438 | " | | $10^{-9}$ |
| "Epon" 828 | " | — | $10^{-12}$ |
| " | Polytetramethylene glycol (MW 650) | 10 | $10^{-12}$ |
| " | " | 20 | $10^{-8}$ |

Each of the above ERL epoxy resins is a cycloaliphatic epoxy resin, the epoxy equivalent weights of which are:

| | Epoxide equivalent weight |
|---|---|
| ERL 4221 | 131–143 |
| ERL 4234 | 133–154 |
| ERL 4206 | 74–78 |
| ERL 4289 | 205–216 |

The D.E.N. 431 and 438 resins are condensation products of epichlorohydrin and novolak resin and have epoxide equivalent weight of 172–179 and 176–181, respectively. "Epon" 828 is a condensation product of epichlorohydrin and bisphenol A having an epoxide equivalent weight of 180–195.

To biaxially oriented polyester film 25 micrometers in thickness were applied solutions containing 2 parts by weight of triarylsulfonium hexafluoroantimonate per 100 parts epoxy resin. The dried coatings were exposed to two medium-pressure mercury lamps for an exposure of 5.3 watts/m$^2$/min. to provide cured surface barriers of about ½ micrometer in thickness. Samples were compared in the Surface Extractables Test to an identical polyester film having no barrier with the following results.

| Barrier Composition | Extracted Trimer |
| --- | --- |
| ERL 4221/Polytetramethylene glycol, MW 650 (90/10) | Non-detectable |
| ERL 4221/Polypropylene oxide based triol, MW 440 (90/10) | Non-detectable |
| No barrier | 3600 μg/cm$^2$ |

COMPARATIVE EXAMPLE A

A magnetic dispersion was made by first premixing the following in a kettle for 2 hours.

| Material | Parts by Weight |
| --- | --- |
| 25% solution of polyurethane elastomer in methyl ethyl ketone | 13.30 |
| 30% solution of phenoxy resin in methyl ethyl ketone | 3.00 |
| 75% solution of dispersant in toluene | 5.30 |
| Additional dispersant | 1.00 |
| Lubricants | 2.75 |
| Additional solvents | 142.90 |
| Acicular gamma-Fe$_2$O$_3$ | 100.00 |
| Carbon black | 1.33 |
| Aluminum oxide | 3.00 |

The polyurethane elastomer was a high-molecular weight polyester polyurethane polymer synthesized from neopentyl glycol, poly-epsilon-caprolactone diol and p,p'-diphenylmethane diisocyanate. The phenoxy resin was a thermoplastic copolymer of equivalent amounts of bisphenol A and epichlorohydrin, and was of the type sold as PKHH by Union Carbide Corp. The acicular iron oxide was modified with cobalt as disclosed in U.S. Pat. No. 3,725,126.

After milling the resultant slurry in a sandmill for 16–20 hours, the following were added:

| | Parts by weight |
| --- | --- |
| 25% solution of the polyurethane elastomer | 33.30 |
| 30% solution of the phenoxy resin | 8.30 | with continued milling until a smooth dispersion was obtained. Solvents were added to adjust to 40% solids, and immediately prior to coating, one part polymethylene polyphenyl isocyanate was added per 100 parts by weight of solids as a cross-linking agent. A gravure roll was employed to coat this dispersion onto a biaxially oriented polyethylene terephthalate polyester film 20 micrometers in thickness, and the wet coating was subjected to a flat magnetic field to align the acicular particles in the lengthwise direction of the film. The dry thickness of the magnetizable coating of the resultant magnetic recording tape was 6.1 micrometers.

To provide good winding characteristics, the backside of the tape was coated with a dispersion of conductive carbon black in a binder similar to that of the magnetizable coating.

EXAMPLE 1

A magnetic recording tape identical to that of Comparative Example A was made except that a subbing layer was applied to the face of the film to which the magnetizable coating was subsequently applied. The subbing layer was made from a solution of:

| | Parts by weight |
| --- | --- |
| Epoxy resin (ERL 4221) | 89 |
| Triethylene glycol | 8 |
| Triarylsulfonium hexafluorophosphate | 2 |
| Surfactant | 1 |
| Methyl ethyl ketone (MEK) | 566 |

Using a gravure roll, the solution was applied to the polyethylene terephthalate film. After 5–10 seconds during which the solvent quickly evaporated, the still-tacky coating was passed about 6 cm beneath a series of four medium-pressure ultraviolet mercury lamps which extended beyond the edges of the film. The lamps provided an exposure of 5.3 watts/m$^2$/min., thus adequately curing the epoxy resin to permit the magnetizable coating to be applied in-line. The thickness of the cured epoxy subbing layer was about ¾ micrometer.

EXAMPLE 2

A magnetic recording tape was prepared in the same way as in Comparative Example A except that the magnetizable coating had a different binder and there was a cationically polymerized epoxy resin barrier layer between the backing film and the backside coating. The magnetizable dispersion, which was coated directly onto the backing film, comprised:

| | Parts by weight |
| --- | --- |
| Acicular cobalt-modified iron oxide particles | 100.0 |
| Polyurethane elastomer | 9.3 |
| Polymethylene polyphenyl isocyanate | 1.3 |
| Polyvinyl chloride/acetate copolymer | 6.6 |
| Dispersant | 6.5 |
| Lubricants | 2.5 |
| Aluminum oxide | 2.0 |

The subbing layer which had a thickness of about ½ micrometer was prepared from:

| | Parts by weight |
| --- | --- |
| Epoxy resin (ERL 4221) | 89.0 |
| Polypropylene oxide based triol, MW 440 ("TP 440") | 9.2 |
| Triarylsulfonium hexafluoroantimonate | 1.8 |

An ultraviolet lamp exposure of 1.5 watts/m$^2$/min. cured the subbing layer to a tack-free state to permit the backside coating to be applied in-line with the application of the barrier.

EXAMPLE 3

A magnetic recording tape was prepared which was identical to that of Example 2 except that the same subbing layer was also employed between the backing film and the magnetizable coating, and the thickness of each barrier layer was about ½ micrometer.

EXAMPLE 4

A magnetic recording tape was prepared identical to Example 3 except both subbing layers were prepared from a 10% solution in MEK of the following:

|  | Parts by weight |
| --- | --- |
| Epoxy resin (ERL 4221) | 90 |
| Poly tetramethylene glycol (MW 650) | 10 |

To this was added 1 part by weight of a catalyst solution comprising 2.38 g of 2,6-dimethylaniline, 3.87 g of dibutyl diphenyl tin, 3.45 g of hydrogen hexafluoroantimonate(V) hexahydrate and 40.3 g of MEK. The catalyst solution was allowed to stand overnight before use. The subbing layers were not exposed to ultraviolet light but were thermally cured at 105° C. for one minute.

The tapes of Comparative Example A and Examples 1-3 were tested on a helical-scan video recorder for
(1) RF output of a 9.0 MHz carrier;
(2) Broadband signal-to-noise ratio;
(3) Color signal-to-noise ratio.

Results in comparison to the tape of Comparative Example A were as follows:

| Tape of Examples | 1 | 2 | 3 |
| --- | --- | --- | --- |
| RF output | −0.2 db | −0.1 db | +0.4 db |
| Signal-to-noise | +0.3 db | +0.5 db | +1.2 db |
| Color-signal-to-noise | +3.4 db | −0.6 db | +2.0 db |

While the tapes of Examples 2 and 3 are not precisely comparable to that of Comparative Example A because of their binder differences, the improvements in color signal-to-noise of Example 1 versus Comparative Example A and of Example 3 versus Example 2 can be attributed to a smoother recording surface due to the underlying barrier layer.

The surface roughness of the polyester film base of Comparative Example A and Examples 1-4 had been measured using a Bendix "Proficorder" Model No. 5 equipped with a 2.5-micrometer stylus. Its peak-to-peak roughness was 0.25 micrometer, whereas that of the subbing layers of Examples 1-3 was 0.05 micrometer.

The tapes of the examples were also tested with the following results:

|  | Volume of Crystals ($cm^3/cm^2$) Example | | | | |
| --- | --- | --- | --- | --- | --- |
|  | A | 1 | 2 | 3 | 4 |
| Subbing Layer Barrier Test | $7 \times 10^{-7}$ | * |  $4 \times 10^{-8}$ | * | * |
| Magnetic Recording Tape Test | $5 \times 10^{-7}$ | $2 \times 10^{-7}$ | $1 \times 10^{-8}$ | * | * |

*indicates $<10^{-14}$

Although the observed volume of crystals reported above may seem small, any amount exceeding $10^{-9}$ $cm^3/cm^2$ is unsatisfactory for most uses, and a value of less than $10^{-2}$ is necessary for many uses. The difference in results of these two tests on the tapes of Example 1 is attributed to crystallization on the surface of the magnetizable layer of low-molecular-weight components which exuded through the backside coating.

References herein to polyester-backed magnetic recording tape are intended to include all forms such as disks, cards and sheets.

We claim:

1. In magnetic recording tape having a biaxially oriented polyester film backing, a magnetizable coating and a subbing layer between the magnetizable coating and film backing, the improvement comprising:
   the subbing layer comprises a cationically polymerized epoxy resin.

2. In magnetic recording tape as defined in claim 1, the further improvement comprising:
   the subbing layer comprises a cationically polymerized cycloaliphatic epoxy resin.

3. In magnetic recording tape as defined in claim 1 which also has a backside coating, the further improvement comprising:
   a second subbing layer between the backside coating and the film backing comprises a cationically polymerized epoxy resin.

4. In magnetic recording tape as defined in claim 1, the further improvement comprising:
   the subbing layer comprises a cationically polymerized epoxy resin which had at least about two 1,2-epoxy groups per molecule and an epoxide equivalent weight of less than 300 and is exceedingly effective as a barrier against extraction and migration of low-molecular-weight components of the polyester film into the magnetizable coating.

5. In a method of making magnetic recording tape comprising the steps of providing a biaxially oriented polyester film backing and applying a magnetizable coating to the backing, the improvement comprising the steps of
   (a) coating a surface of said film backing with a composition comprising a cationically polymerizable epoxy resin, and
   (b) cationically polymerizing the epoxy resin to a tack-free state to provide a subbing layer for said magnetizable coating.

6. In a method as defined in claim 5, the further improvement comprising:
   employing in step (a) an epoxy resin having an epoxide equivalent weight of less than 300 in order to provide an especially effective barrier against extraction and migration of low-molecular-weight components of the polyester film into the magnetizable coating.

7. In a method as defined in claim 5, the further improvement comprising
   carrying out step (a) in-line with the application of the magnetizable coating.

8. In a method as defined in claim 5, the further improvement comprising
   including in the composition employed in step (a) a photoinitiator which decomposes under ultraviolet light to yield a cationic curing agent for said epoxy resin and
   in step (b), exposing the epoxy resin to ultraviolet light to decompose the photoinitiator.

9. In a method as defined in claim 5, the further improvement comprising the additional steps of
  (c) coating the other surface of said film backing with a composition comprising a cationically polymerizable epoxy resin, and
  (d) cationically polymerizing that epoxy resin to a tack-free state, thus providing a second subbing layer over which a backside coating may be applied.

10. In a method as defined in claim 9, the further improvement comprising
  including in each composition employed in steps (a) and (c) a photoinitiator which decomposes under ultraviolet light to yield a curing agent for the epoxy resin and
  in steps (b) and (d) exposing the epoxy resin to ultraviolet light to decompose the initiator.

11. In a method as defined in claim 5, the further improvement comprising
  including in the composition employed in step (a) a heat-activable cationic curing agent for said epoxy resin and
  in step (b), heating the coating for a time and at a temperature sufficient to cure the epoxy resin.

12. In a method as defined in claim 5, the further improvement comprising:
  mixing with the epoxy resin a polyol in an amount up to 30% by weight of the mixture.

13. In a method as defined in claim 12, the further improvement comprising
  the polyol comprises up to about 10% of the mixture and enhances the rate of polymerization of the epoxy resin.

14. In a method as defined in claim 5, the further improvement comprising
  mixing with the epoxy resin an alkyl glycidyl ether in an amount up to 50% by weight of the mixture.

* * * * *